Feb. 26, 1929.  
W. J. MILLER  
1,703,316  
METHOD AND MECHANISM FOR FEEDING PLASTIC MATERIAL TO MOLDS  
Filed Dec. 7, 1926

INVENTOR  
William J. Miller  
BY  
K. G. Doub.  
ATTORNEY

Patented Feb. 26, 1929.

1,703,316

UNITED STATES PATENT OFFICE.

WILLIAM J. MILLER, OF SWISSVALE, PENNSYLVANIA.

METHOD AND MECHANISM FOR FEEDING PLASTIC MATERIAL TO MOLDS.

Application filed December 7, 1926. Serial No. 153,086.

This invention relates to an improved method of and mechanism for feeding plastic material to molds in the manufacture of pottery.

Heretofore the plastic material from which the article of pottery is ultimately produced has been fed to the molds by hand, or manually, the operator picking up a charge or batch of the plastic material in his hand, and after preforming the charge or batch, throwing it into or on a mold with sufficient force to cause it to spread and adhere to the mold.

The primary object of the present invention therefore, is to provide a method and mechanism whereby the plastic material may be fed to the molds automatically.

More specifically, the invention provides a method and mechanism which will extrude the plastic material or clay onto a former, segregate the material in predetermined charges, preform the charges, and deposit them in suitable molds with sufficient force to cause the charges to spread and adhere to the molds, the sequential operations being performed entirely automatically and in timed relation, adjustments being provided to assist in the timing operation and also to enable the size of the charge to be varied in accordance with the article of pottery desired to be produced.

The invention also contemplates the provision of means for automatically cleaning the molds prior to receiving the charge of plastic material and which has also been heretofore performed manually.

The improved method and mechanism may be utilized in conjunction with a mold carrier or conveyor of any suitable type which will opperate to bring the molds successively in position to receive a batch or charge of the plastic material, or the molds may be placed in position manually, it being immaterial in so far as the present invention is concerned as to the means for disposing the molds in position under and removing them from the feeding mechanism. The present method and mechanism may also be used in timed relation with a jigger such, for instance, as is disclosed in my copending applications Serial Nos. 143,994, filed October 25, 1926, and 148,872, filed Nov. 17, 1926, or with any other suitable jigger, press or fabricating mechanism.

The accompanying drawings show a preferred form of mechanism adapted to carry out the improved method, and it is to be understood that other instrumentalities could be adopted to effect the several timed operations without departing from the scope of the invention as hereinafter described and claimed.

Figure 1:
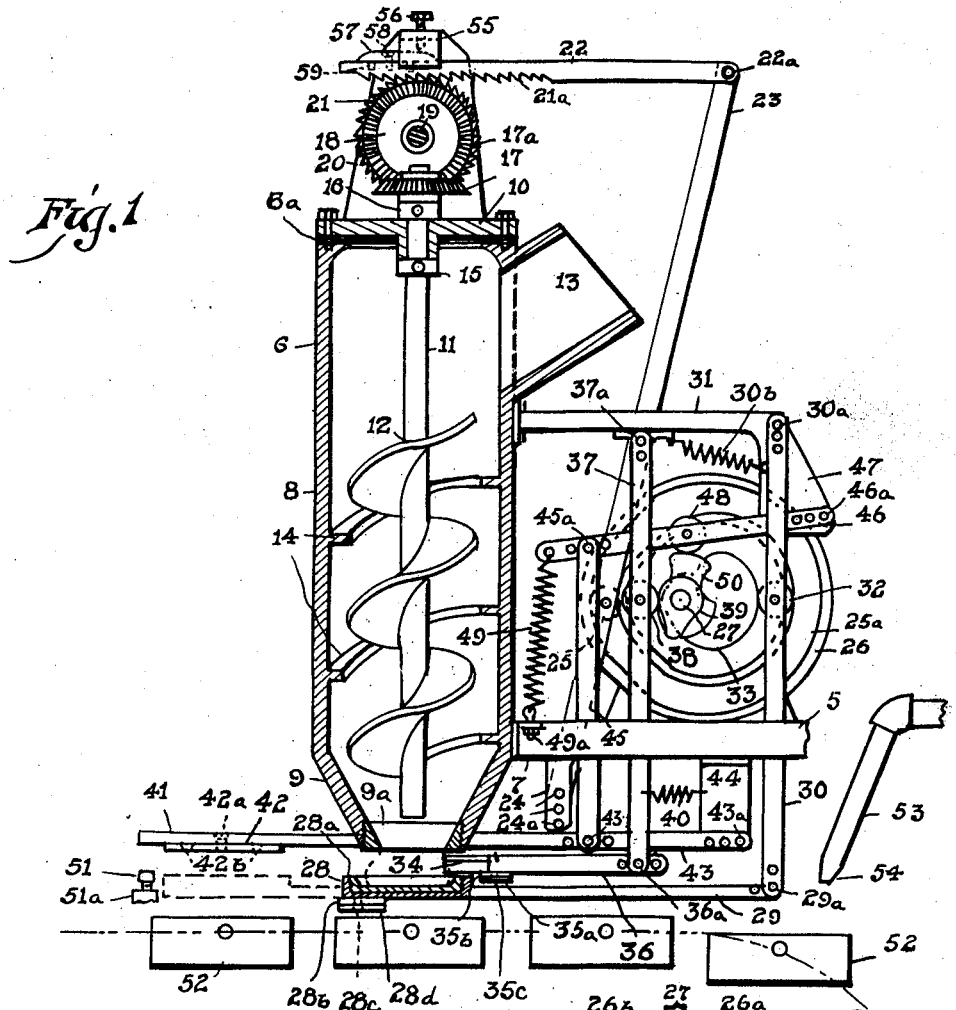
Figure 1 is a side elevation, partly in section, of a preferred form of mechanism adapted to carry out my improved method, a number of molds being shown moving in position to receive a charge of plastic material.

The improved mechanism is supported by a suitable frame, a part of which is shown at 5. A container 6 is secured to the frame member 5 in any suitable manner, as for instance by screw bolts 7, and the wall 8 of this container is preferably vertically straight to within a short distance of the bottom of the container, where it is preferably inclined inwardly or converges, as at 9, the container being truncated and open at the bottom to permit extrusion of plastic material at this point. The top of the container is closed by a cover or lid 10, and extending through the said top downwardly into the container is a shaft 11, which has secured thereto a spiral screw blade 12, which acts to feed the plastic material downwardly when the said shaft 11 with its screw blade 12 is rotated in the proper direction.

It will be obvious that any suitable means could be employed to feed or extrude the plastic material, and I have simply shown the present means to illustrate one way of accomplishing this result. The lower truncated extremity of the container 6 has inner screw-threads for removable and adjustable application of an orifice member 9ª, which can be replaced by other orifice members having openings varying in shape and size. A chute 13 is also provided at the upper extremity of the container for supplying plastic material thereto. The inner side of the wall 8 of the container has flanges or inwardly projecting ribs 14, which are preferably inclined in a direction reverse to the inclination of the blade 12 and extend inwardly close to the outer periphery or edge of the said screw-blade 12, to assist the latter in its feeding operation. Where the shaft 11 extends through the top or cover 10 of the container 6, suitable thrust or bearing collars 15 and 16 are provided above and below the said top or cover, and secured to the upper end of said shaft immediately above the collar 16 is a bevel gear 17, which meshes with bevel teeth 17$^a$ formed on the one side of a gear 18 near its outer periphery. The gear 18 is mounted on a shaft 19, which may be held by a bracket 20, bolted or otherwise secured to the top or cover 10, or the shaft 19 may extend from other mechanism adapted for use with the improved feeder mechanism. The gear 18 also has inclined teeth 21 on its outer periphery which mesh with reversely inclined teeth 21$^a$ on a ratchet bar 22, the latter being pivoted at one extremity, as at 22$^a$, to the upper end of a rod or bar 23, this bar 23 extending downwardly to the lower portion of the mechanism, where it is pivoted at its lower extremity to an extension member 24 of the frame 5, the said member 24 and bar 23 being formed with a number of pivot holes, as at 24$^a$, so that the pivotal connection of the rod or bar 23 may be adjusted to vary the stroke of the ratchet bar 22 and through the gears 18 and 17 and shaft 11 with its screw blade 12 vary the amount of plastic material fed or forced through the lower extremity or orifice opening of the container 6. Approximately midway of its lower extremity the rod or bar 23 has rotatably mounted at one side thereof a cam roller 25, moving in a cam-way or cam track 25$^a$, formed in a cam wheel or disk 26, adjustably secured as by a screw 26$^a$ and hub 26$^b$ to a main drive shaft 27, preferably driven in timed relation from other mechanism, not shown, or by any suitable motive means. The cam roller 25 and cam-way or track 25$^a$ are shown at the right-hand portion of Fig. 1, and it will be seen that as the cam wheel or disk is rotated by the shaft 27, the cam roller 25, rotatably mounted on the rod or bar 23, will move in the cam-way or track 25$^a$ and through said bar 23, ratchet bar 22 and gears 18 and 17, impart an intermittent rotation to the shaft 11 with its screw blade 12, and at each turn or partial turn, depending upon the adjustment of the pivotal connection of the bar 23, a definite or predetermined charge or gob of plastic material will be extruded from the lower open truncated end of the container 6, or through the restricted orifice bushing 9$^a$.

Figure 2:
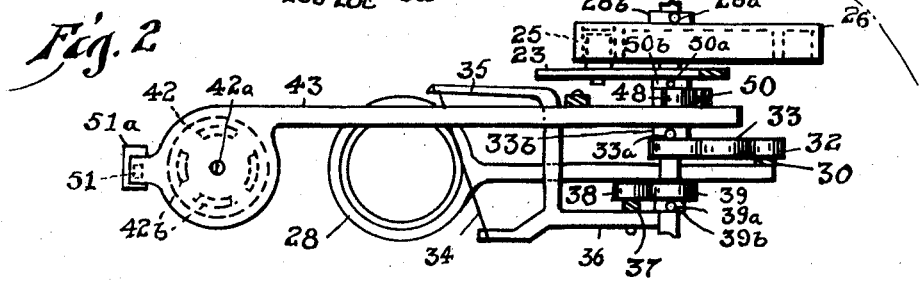
Fig. 2 is a plan view of the cam mechanism, severing or segregating means, preforming means and transfer member.

Mounted horizontally at the lower portion of the feeding mechanism is a former-holder 28, preferably of the shape or contour shown in plan by Fig. 2 and in section by Fig. 1. It will be seen that the one extremity of this holder 28 is rounded or disk-shaped and the upper surface of this disk has a screw-threaded recess or dished portion 28$^a$, in which formers having screw-threads on the outer lower portion thereof may be threadedly secured and adjusted as to height. These formers will be preferably made of a material and properly treated to resist adhesion of the plastic charge thereto, and said formers also serve to intercept the charge of plastic material and may limit the spreading action thereof and thus operate in conjunction with the extruding pressure exerted on the material to preform the lower and peripheral portion of the charge, or either the lower or peripheral portion thereof. The handle extremity 29 of the former-holder 28 is adjustably pivoted, as at 29$^a$, to the lower extremity of a rod or bar 30, and this bar extends substantially vertically in an upward direction and is adjustably pivoted, as at 30$^a$, at its upper extremity to a support 31, which may be attached to the outer side of the wall 8 of the cylindrical container 6 or be part of the frame for supporting the mechanism as a whole. At a short distance above, or approximately the central point of its length the rod or bar 30 has rotatably mounted thereon a cam roller 32, which is in continuous engagement with a cam 33, also adjustably secured by a screw 33$^a$ and hub 33$^b$ on the shaft 27. The approximate shape or contour of the cam 33 is shown in Fig. 1, and when the raised or high part of this cam engages the roller 32 mounted on the rod or bar 30, the recess 28$^a$ carrying a former will be in a position directly under the container to receive a charge or gob of plastic material, and when the cam 33 revolves and the low part thereof engages the roller 32, the former-holder will be caused to move laterally, through the tension of a spring 30$^b$, attached at one extremity to the rod or bar 30 and at its opposite extremity to the support 31, to a position and for a purpose which will be hereinafter explained.

In order to segregate or separate the charges of plastic material as they are extruded from the container through the orifice opening, a wire or knife or cutter 34 is mounted in a yoke 35, with a handle extremity 36, adjustably pivoted, as at 36$^a$, to a rod or bar 37, which extends substantially vertically upwardly and is adjustably pivoted, as at 37$^a$, to the support 31. Approximately midway of its length the rod or bar 37 has a cam roller 38 rotatably mounted thereon, which is in continuous engagement with a cam 39, adjustably secured by a screw 39$^a$ and hub 39$^b$ on the shaft 27. The approximate contour of this cam 39 is shown in Fig. 1, and is formed with a low and a high part of such dimensions that when the low part engages the roller 38 on the rod or bar 37, the knife 34 will be retracted by the tension of a spring 40, fixed to the lower extremity of the rod or bar 37 and part of the frame 5, and when the high part of the cam engages the roller 38, the knife will be moved forwardly to perform its cutting function. The knife yoke or holder 35 is adjustably supported by a bracket 35$^a$ on the upper surface of which is secured an adjusting shim 35$^b$ by a screw 35$^c$, and the former holder is also adjustably supported by a bracket 28$^d$ with an adjusting shim 28$^b$ secured by a screw 28ᶜ on the upper surface thereof. The brackets 35ᵃ and 28ᵃ are preferably attached to or form a part of the frame of the machine. The shims 35ᵇ and 28ᵇ are also preferably formed on their upper surfaces with laterally grooved portions or in any other well known manner provided with means for guiding and preventing lateral displacement of the parts sliding thereover.

A feature of novelty in the present invention resides in the provision of what is termed a transfer member 41, shown in plan by Fig. 2. At the left extremity this transfer member is formed with a flat disk-like head, and the lower surface of this head has detachably secured thereto means for causing the charge of plastic material to adhere to the head of the transfer member. Different means could be adopted for causing the plastic material or charge to adhere to the transfer member, but I prefer to provide the lower surface of the disk or head with a plate 42, removably secured to the head by a screw 42ᵃ, this plate having a number of V-shaped openings 42ᵇ, into which some of the plastic material is squeezed or forced when the transfer member descends and preforms the charge by pressing or squeezing it between the disk head and former, and when the transfer member rises, the charge will as a consequence adhere to the plate and disk head, particularly in view of the fact that the former has properties which resist adhesion of the charge. The lower forming surface of the plate 42 may have various shapes and contours in accordance with the ware to be formed. The transfer member 41 is also mounted horizontally at the lower extremity of the mechanism and the handle portion or extension 43 thereof extends across and is adjustably pivoted as at 43ᵃ to a projection 44 of the frame 5. Substantially intermediate of its horizontal extent the handle portion 43 of the transfer member is adjustably fulcrumed as at 43ᵇ to a rod or bar 45, which is also adjustably fulcrumed at its upper extremity as at 45ᵃ to a rod or bar 46, which extends in a substantially horizontal plane and is adjustably pivoted at 46ᵃ to an extension 47 of the support 31. Approximately intermediate of its lateral extent the rod or bar 46 has a cam roller 48 rotatably mounted thereon, and a coil spring 49, attached at its one extremity to the end of the bar 46 and adjustably secured at its opposite extremity by means of a screw bolt 49ᵃ with a hook head, holds the bar 46 under tension, and by screwing inwardly and unscrewing the bolt 49ᵃ, the tension of this spring may be increased and decreased to in turn increase and decrease the speed of fall of descent of the transfer member 41. The cam roller 48 is in continuous engagement with a cam 50, adjustably secured as by a screw 50ᵃ and hub 50ᵇ on the shaft 27. The approximate contour or face of this cam 50 is shown in Fig. 1, and is so formed as to impart four distinct timed movements or operations to the transfer member, viz: to first raise the said transfer member a sufficient distance to permit the former with a charge of plastic material thereon to move under the transfer member, second, to gradually lower the transfer member and squeeze the charge between the lower surface of the disk head or the plate 42 of the transfer member and the former, third, to again gradually raise the transfer member to the highest point of its rise or the highest part of the cam, and fourth, to drop the transfer member by gravity assisted by the tension of the spring 49 and impact against an adjustable stop or projection 51, which may be threaded into a bracket 51ᵃ fixed to the stationary frame of the mechanism, with such force as to throw the charge into or on a mold and cause it to spread and adhere to the latter.

The container 6 has means at the top thereof for vertical adjustment of the shaft 11 with its screw blade 12, in the form of shim washers 6ᵃ, so that the blade may be disposed at the proper distance from the bottom of the container 6 to obtain the desired results.

As the charge of plastic material is extruded through the orifice at the lower open end of the container 6 onto the former, it is spread below the orifice by contact with the former and is formed with a neck, and it is through this neck the knife or cutter passes to segregate the charge. It is desirable that at approximately the time this neck is severed, a slight retraction be given the protruding stub of plastic material, so that the knife will be free of the plastic material during the return movement of the knife and for other advantageous purposes. This retraction of the plastic material may take place just immediately prior to severing, during severing, or immediately after severing, or it can be continued through all or part of the above periods. This retraction also has the advantage in that as the knife moves through the neck, the mass of plastic material above may be progressively and simultaneously lifted or raised from the knife and also from the charge as it is being severed or segregated. This advantage obtains also when retraction is continued during severance. The diamter of the neck may be reduced by initiating this retraction prior to severance. To accomplish this retraction of the plastic material with its attendant advantages, I have provided means for causing the bar 22 to press down on the inclined gear teeth 21 of the gear 18 during part of the return movement or stroke of the said bar 22 and thus impart a slight reverse reciprocation to the shaft 11 and consequently a reverse motion to the screw blade 12. This means preferably consists of a bracket 55, which may be formed integral with, or attached to, the bracket 20. This bracket is formed with a guide slot through which the ratchet bar 22 slides, and prevents lateral movement or play of said bar. The top of the bracket 55 is formed with a screw-threaded opening for a set screw 56. On the top surface of the ratchet bar 22 a block 57 is adjustably and removably mounted by means of screws 58 inserted in openings 59, a number of these openings being formed along said bar so that the block may be moved when different adjustments are desired. The block has beveled or inclined extremities and is placed so that it will contact with the end of the screw 56 at approximately the start of the reverse stroke of the bar 22, and the screw is adjusted to a point which will prevent the ratchet teeth 21ª from riding off of the beveled teeth 21 of the gear 18 and thus impart a slight reverse movement to the blade 12 at each reverse stroke of the bar 22.

Means are also provided for cleaning the molds, indicated by the reference character 52, prior to receiving a charge of plastic material, this means in the present instance being in the form of a pipe 53, extending to a fan or other suitable supply of air under pressure, not shown, and the nozzle 54 of this pipe is directed so as to cause a current of air to play on the interior of the molds as they move into position to receive the charge of plastic material. By this means particles of clay or other matter, or dust and other interfering substances, are removed from the interior of the mold prior to receiving a new charge of plastic material.

The improved feeding mechanism is entirely automatic in its operation, and adjustments are provided for the various cams as well as the screw blade 12 and at all other desirable points, so that the various parts may be conveniently timed and adjusted.

From the foregoing description the operation of the improved mechanism should be readily understood. The operation is of course subject to the various adjustments in accordance with the article of pottery desired to be produced, but a general statement of the sequential timed movements of the main coacting parts may be outlined as follows:

When motion is imparted to the drive shaft 27, the cam roller 25 moves in the cam-way or track of the cam wheel or disk 26, to in turn reciprocate the bar 23, ratchet bar 22, gears 18 and 17 and shaft 11 with its screw blade 12, and extrude a charge of plastic material onto a former, which will be threaded into the recess 28ª of the former holder and adjusted the proper height relatively to an orifice member threaded into the lower screw-threaded opening of the container 6 and which may also be adjusted in a vertical direction relatively to the screw-blade 12 or knife 34. When the ratchet bar 22 has completed its feeding stroke, which in the present instance will be at the end of its pull or inward movement, the gob or charge will have been forced through the orifice opening onto the former, the lower greater bulk or portion of the charge being spread onto the former and assuming a bulbous shape and the upper portion of the charge assuming a neck. When the ratchet bar completes its feeding stroke it will reciprocate in the opposite direction and impart a slight reverse movement to the screw blade 12 and a retraction or lift of the plastic material, depending upon the adjustment of the block 57 and set screw 56 relatively to the said bar 22. The knife 34 may be adjusted through the cam 39 on the shaft 27 to sever the neck of the gob or charge in accordance with the adjustment of the screw blade 12 through the block 57 and set screw 56, or, it may sever the neck of the charge at any time, as for instance during the feeding stroke, immediately after completion of the feeding stroke, during retraction of the plastic material or after retraction of the plastic material. The charge will have then been segregated, and at this time the cam 33 may be adjusted so that the roller 32 will ride in the low part of the cam and the former-holder bearing the charge of plastic material slides over and under the transfer member 41, as shown in dotted lines in Fig. 1, the cam 50 having been adjusted to slightly elevate or raise the transfer member 41 so as to clear the former holder, the former and also the projecting charge. The cam roller 48 will then ride into a depression in the cam 50 and cause the transfer member to descend and squeeze the charge between the adhesion plate 42 and the former, to thereby partly preform the charge and also cause some of the plastic material to be pressed into the V-shaped openings of the plate 42. The cam roller 48 then moves over towards the highest raise on the cam 50, and through the connections heretofore described, causes the transfer member with the charge adhering thereto to gradually rise until the roller 48 rides over the highest part of the cam 50. The former holder bearing the empty former at this time is caused to move back or retract preparatory to receiving another charge. The cam roller 48 continues to ride over the highest part of the cam 50 until it reaches the sharp drop or incline on said cam, when it rides over said incline or drop and causes the transfer member 41 to descend rapidly by gravity assisted by the tension of the spring 49 and impact against the stop or projection 51, depositing or throwing the charge into or on a mold, which will then be in position under the transfer member, with such force as to cause the charge to spread and adhere to the mold.

The orifice member may have any desired opening and the formers may also have various shapes. For instance, the former may be flat, or substantially so, and the orifice opening of substantially the same size, so that the material may be extruded onto the former and sliced into flat disk-like charges.

It is evident that any number of feeding mechanisms may be mounted in parallel or in series, or in parallel and series, to feed any number of molds simultaneously, or approximately simultaneously, by merely extending the shaft 27 and frame 5 to support the various units and also by suitable belts, gears, or other means for synchronizing the series of feeding mechanisms.

The container 6 may have the plastic material delivered thereto in any practical manner, either manually or mechanically, it being unnecessary to press or pack the plastic material in the said container above the screw blade 12. As the plastic mass is progressed towards the bottom or outlet extremity of the container, the density thereof gradually increases, so that the extruded charges will be uniform and in an advantageous condition to be preformed and delivered into or on a mold. In the event the plastic mixture is delivered into the upper portion of the container in large lumps or balls, the progressive feed of the screw blade 12 will eliminate all stratification and cause the mixture to unite in a homogenous mass.

What is claimed as new is:—

1. In mechanism of the class specified, means for automatically extruding charges of plastic material onto a former, and means for lifting the charges from said former and throwing them into suitable molds.

2. In mechanism of the class specified, adjustable automatic means for feeding a charge of plastic material onto a former, means for segregating the charge, means for preforming the charge, and means for lifting the charge from the former and depositing it in a mold.

3. In mechanism of the class specified, means for progressively and automatically feeding successive charges of plastic material onto a former, means for segregating the charges, means for preforming the charges, and a transfer member for lifting the charges from the former and depositing them in suitable molds.

4. In mechanism of the class specified, means for transferring a charge of plastic material from a former to a mold, consisting of a laterally extending member fulcrumed at one extremity and provided with charge adhering means at its opposite extremity, and cam devices operating to raise and lower said member in timed relation to a former carrying member.

5. In mechanism of the class specified, means for transferring a charge of plastic material to a mold, consisting of a horizontally disposed member with a disk-like head provided on its under surface with adhering means, and cam devices for operating said member.

6. In mechanism of the class specified, means for lifting a charge of plastic material from a former and depositing it on a mold, consisting of a horizontally disposed member with an enlarged head, charge-adhering means on the lower surface of said head, and cam devices for raising and lowering said member.

7. In mechanism of the class specified, means for transferring a charge of plastic material to a mold, comprising a handle extremity fulcrumed at an intermediate portion thereof and pivoted at its end to a vertically extending bar, the latter bar being in turn fulcrumed to a horizontally disposed bar with a cam roller thereon in constant engagement with an operating cam, and charge-adhering means detachably secured to the lower surface of one extremity of said means.

8. In mechanism of the class specified, a former-carrying member provided with an enlarged head having a threaded recess on its upper surface for adjustably and removably receiving a former, and cam devices for reciprocating said member in a lateral direction.

9. In mechanism of the class specified, a former-carrying member provided on its one extremity with a recess for removable and adjustable securement of a former, and cam devices operating to move said member forwardly and rearwardly in timed relation to a charge-removing and transferring member, means being also provided for vertically adjusting said member.

10. In mechanism of the class specified, a container for plastic material, means for progressing the material through said container onto a former, means for segregating the material in charges, means for retracting the material to assist in the segregating operation, means for preforming the charges, and means for lifting the charges from the former and depositing them in suitable molds.

11. In mechanism of the class specified, a container for plastic material, a screw blade for extruding a charge of plastic material, a former member adapted to receive the charge, means for segregating the charge, means for reversing the screw blade to retract the material to assist in the segregating operation, and a transfer member for preforming the charge and transferring it to a mold.

12. In mechanism of the class specified, a container for plastic material, a removable and adjustable orifice member, a former adjustably disposed relatively to the orifice member, means for progressing the material through said container and orifice member onto the former, means for adjusting said progressing means relatively to the orifice member, means for segregating the material in charges, and a preforming and transfer member cooperating with said former.

13. In mechanism of the class specified, a container for plastic material, means in said container for progressively feeding the plastic material onto a former, means for segregating the material in charges, and means for lifting the charges from the former and depositing them in suitable molds.

14. In mechanism of the class specified, a container for plastic material, means in said container for extruding the plastic material onto a former, means for adjusting the extruding means, means for segregating the material in charges as it is extruded, means for preforming the charge, and means for lifting the charge from the former and depositing it in suitable molds.

15. In mechanism of the class specified, a container for plastic material, adjustable means in said container for extruding the plastic material onto a former, means for segregating the plastic material into charges, and means for preforming the charges, lifting the charges from the former and depositing them in suitable molds.

16. In mechanism of the class specified, a container for plastic material, feeding means in said container, means for imparting an intermittent feeding actuation to said feeding means to extrude predetermined charge of plastic material onto a former, means for reversing the feeding means to thereby retract the plastic material, means for segregating the material in charges, and means for preforming the charges and transferring them to suitable molds.

17. In mechanism of the class specified, a container for plastic material, adjustable feeding means in said container, adjustable means for imparting intermittent rotation to said feeding means, a former holder having a recess for adjustable and removable application of a former, means for adjusting the former holder relatively to the container, means for segregating the material in charges, and means for preforming each charge and depositing it in suitable molds.

18. In mechanism of the class specified, a container for plastic material, adjustable feeding means in said container, adjustable means for imparting intermittent rotation to said feeding means, a former holder having a recess for adjustable and removable application of a former, means for adjusting the former holder relatively to the container, means for segregating the material in charges, means for preforming each charge and depositing it in suitable molds, and means for cleaning the molds prior to receiving the charge of plastic material.

19. In mechanism of the class specified, a cylindrical container for plastic material having a lower truncated open end, a screw blade in said container, a former holder having a screw threaded recess for removable and adjustable application of a former, an adjustable knife bracket carrying a knife, a transfer and throwing member, and adjustable cam devices for operating the screw blade, former holder, knife bracket and transfer and throwing member in timed relation to feed a charge of plastic material onto a former, segregate the charge, preform the charge and deposit it in a suitable mold.

20. In mechanism of the class specified, a cylindrical container for plastic material having a screw threaded orifice opening at the lower extremity thereof, an orifice member in said opening, feeding means in said container, means for reversing the feeding means to retract the plastic material, severing means in timed relation to the feeding means and reversing means, a former holder having a recess for removable and adjustable application of a former, means for adjusting the severing means relatively to the orifice member and former, and means for transferring a charge of plastic material from the former to a mold.

21. In mechanism of the class specified, a cylindrical container with a screw threaded orifice opening at the lower extremity thereof, an orifice member vertically adjustable in said opening, a spiral screw blade in said container, means for operating said screw blade to extrude plastic material onto a former, a former holder, severing means and transfer member, and means for operating the screw blades, former holder, severing means and transfer member in timed relation to segregate the material in charges and deposit the latter in suitable molds.

22. In mechanism of the class specified, a cylindrical container for plastic material, a spiral blade in said container, means for imparting an intermittent rotation to said blade to extrude the plastic material, said means being adjustable to impart varying degrees of reverse rotation to the blade to thereby retract the plastic material, means for segregating the material in charges, a former holder and former, a transfer member, the former holder being movable laterally in position under the container and also under the transfer member, and means for operating the transfer member in timed relation to the former holder to lift a charge of plastic material from the former and deposit it into a mold.

23. In mechanism of the class specified, a cylindrical container for plastic material, means in said container for progressively and intermittently feeding charges of plastic material onto a former, means for operating said feeding means, means for severing the material in charges, means for adjustably and removably holding the former in position under the container, means for laterally moving the former holder, a transfer member, and adjustable means for operating the transfer member to lift a charge of plastic material from the former and deposit it into a mold.

24. In mechanism of the class specified, a container for plastic material, a spiral blade in said container, the container having a lower screw-threaded orifice for adjustable insertion of an orifice member, a former carrying member having a recess for adjustably receiving a former, severing means, means for rotating the spiral blade to extrude a charge of material, said means also operating to reverse the rotation of the spiral blade to retract the plastic material relatively to the orifice opening, and means for adjusting the severing means to operate during retraction of the plastic material.

25. Mechanism according to claim 24, in which the means for rotating and reversing the rotation of the spiral blade and the means for operating the severing means may be relatively adjusted to cause the severing means to pass thru the plastic material either prior to retraction, during retraction or immediately after retraction of the plastic material.

26. The method of feeding plastic material to molds in the manufacture of pottery, which consists in progressing the material through a container onto a former, segregating the material into charges, confining the charge between a transfer member and the former to preform the charge, and transferring the charge to a mold through the adhesive characteristics inherent in the charge.

27. The method of feeding plastic material to molds in the manufacture of pottery, which consists in progressing the material through a container having a restricted outlet onto a former, segregating the material into predetermined charges, compressing the charges between a transfer member and the former to preform the charges, and lifting the preformed charges from the former through the adhesive characteristics inherent in the material and forcefully depositing them into or on a mold.

28. The method of feeding plastic material to molds in the manufacture of pottery, which consists in progressing the material through a container having a variable restricted outlet onto a former, segregating the material in predetermined charges, squeezing the charges between a transfer member and the former to preform the charges, lifting the charges from the former through the inherent plasticity of the material and forcefully depositing them into or on suitable molds.

29. The method of feeding plastic material to molds in the manufacture of pottery, which consists in progressing the material through a container onto a former adapted to resist adhesion of the material, segregating the material in charges, squeezing the charges between a transfer member adapted to promote adhesion of the material and the former to preform the charges, and transferring the charges to a mold through the adhesive properties of the material.

30. The method of feeding plastic material to molds in the manufacture of pottery, which consists in extruding the material from a container having a restricted outlet to form a column, intercepting the column by a former shaped to confine and limit the spreading of the column, the column assuming a bulbous shape with a reduced neck portion, segregating the material in charges by severing the neck of the column and retracting the material to assist in segregation, compressing the charges between the former and a transfer member to preform the charges, and transferring the charges through the adhesive character of the material.

Signed by me this 29th day of November, 1926.

WILLIAM J. MILLER.